United States Patent [19]
Ziesenis

[11] Patent Number: 5,584,426
[45] Date of Patent: Dec. 17, 1996

[54] WELDING WIRE HOLDING DEVICE

[76] Inventor: Glenn R. Ziesenis, 10066 S. 103rd West, Clearwater, Kans. 67026

[21] Appl. No.: 506,381

[22] Filed: Jul. 24, 1995

[51] Int. Cl.$^6$ .................................................. B23K 37/00
[52] U.S. Cl. ........................ 228/41; 219/137.2; 226/181
[58] Field of Search ........................ 228/41; 219/137.2; 226/181

[56] References Cited

U.S. PATENT DOCUMENTS

| | | | |
|---|---|---|---|
| 3,675,837 | 7/1972 | Gerould | 226/181 |
| 4,068,106 | 1/1978 | Shaputis | 226/181 X |
| 5,155,332 | 10/1992 | Maguire | 228/41 X |

*Primary Examiner*—Kenneth J. Ramsey
*Attorney, Agent, or Firm*—Kenneth H. Jack

[57] ABSTRACT

A welding wire holding device comprising a wire dispensing housing, the lower floor thereof extending downward and forming a handle, the handle being of a size and shape suited to be gripped by a welder's gloved hand, a wire compression roller rotatably mounted within the housing, a wire driving roller rotatably mounted within the housing, a thumb wheel rotatably mounted within the housing, the wire driving roller, the compression roller and the thumb wheel being aligned and configured within the housing to allow the thumb of a welder's gloved hand holding the device to rotate the thumb wheel, causing counter-rotation of the wire driving roller, causing a frictional thrust to be imposed upon a welding wire passing through the housing and between the wire driving roller and the wire compression roller, thus dispensing the welding wire forward and outward from the device.

10 Claims, 4 Drawing Sheets

WELDING WIRE HOLDING DEVICE

BACKGROUND OF THE INVENTION

Where a welder performs gas tungsten arc welding, one of the welder's hands commonly holds an electrode receptacle which has a pointed tungsten electrode protruding therefrom, such receptacle having an electrically conductive insulated wire leading thereto. The other end of the wire is connected to a voltage source, which is electrically connected to an electrically conductive metal workpiece. The voltage source induces an electrical potential difference between the tungsten electrode and the metal workpiece. When the tungsten electrode is brought into close proximity with the metal workpiece, electric arcing occurs, resulting in heating of the metal. In order to prevent oxidation of the metal while heating occurs through electric arcing, the electrode receptacle held by the welder simultaneously causes an inert gas such as helium to flow over the heated area.

The heating of the metal workpiece and the prevention of oxidation facilitates welding. Typically, the welder holds a metal welding rod in the welder's other hand. The end of the welding rod is inserted into close proximity with the heated area of the work piece, causing the metal of the workpiece and the metal of the welding rod to comingle in a molten metal pool. Such a molten metal pool may be caused to traverse seams, cracks, joints and the like in the metal workpiece resulting in fusion or welding.

Oxyacetylene welding involves a similar process in which one of the welder's hands holds a blow torch which mixes at the point of burning oxygen and acetylene gas. The flame of an oxyacetylene torch heats a metal workpiece while the welder introduces a metal welding rod into close proximity with the heated area. As in gas tungsten arc welding, cracks, fisures, joints and the like in the metal workpiece are fused through pooling of molten comingled metal from the welding rod and the metal workpiece.

In both gas tungsten arc welding and in oxyacetylene welding, the welder typically has a heavy gloves covering the welder's hands. Gloves are worn to prevent flying molten metal from burning the welder's hands. When arc welding is performed, gloves help insulate the welder's hands from electric current flowing through the electrode or the welding wire. Wearing such heavy gloves makes it difficult for a welder to manipulate a metal welding rod which typically is less than one-eighth inch in diameter. Ideally, the welding rod extends eight to ten inches from the welder's left hand to the workpiece. However, progression of welding uses up and shortens the welding rod, causing a need for repeated extensions of the welding rod through the welder's gloved hand toward the workpiece. It is difficult for a welder's gloved hand to extend a welding rod as an ungloved hand might extend a pencil. It is also inconvenient to tilt the welding rod to allow gravity to draw the rod through the fingers of the gloved hand. It is also inconvenient for the welder to release the electrode or torch held by the welder's right hand in order to use the right hand to extend the welding rod through the welder's left hand. It is also inconvenient to allow the tip of the welding rod to temporarily fuse to the workpiece to allow the left hand to be drawn upward along the welding rod. Also, additional electrical insulation between the welding rod and the welder's hand is often desireable. These inconveniences give rise to a need for an apparatus to be held in a welder's gloved hand for holding, directing and extending a welding wire, and providing additional electrical insulation between the welder's hand and the welding wire.

BRIEF SUMMARY OF THE INVENTION

With the foregoing considerations in mind, the present invention contemplates an electrically insulating welding wire holding, directing and extending device to be held in a welder's gloved hand. The device comprises a single milled piece of metal, preferably aluminum. Use of metal to form the device provides weight facilitating manipulation of the device by a heavily gloved hand. The lower end of the milled piece of metal is cut in the form of a handle for gripping by a welder's gloved hand, and whose upper end is cut to form a housing for a wire compression roller, a wire driving roller, and a thumb wheel. The back wall of the housing has a wire receiving aperture, and the front wall of the housing has a wire dispensing aperture. Rotatably mounted within the housing is a wire compression roller whose axle is disposed through the upper wall of the housing through the axis of rotation of the wire compression roller, and secured to the floor of the housing by means of a threaded screw fitting. The wire compression roller is positioned within the housing so that the exterior radial surface of the roller is tangent to a line extending from the wire receiving aperture to the wire dispensing aperture. Also, rotatably mounted within the housing is a wire driving roller. Said rotatable mounting is accomplished by means of an axle extending downward through the upper wall of the housing, through the axis of rotation of the wire driving roller, and secured to the floor of the housing by means of screw threading. The wire driving roller is positioned within the housing so that as a welding wire passes through the wire receiving and wire dispensing apertures, the wire receives a laterally opposed compressive force from the wire compression roller and the wire driving roller. Preferably, the wire driving roller has a semi-circular annular channel fitted to the diameter of the particular welding wire being use. Attached to the upper end of the wire driving roller axle is a knurled head. The knurled head allows the wire driving roller axle to be manually removed, allowing wire driving rollers to be interchanged, such rollers having channels to accommodate welding wire of varying diameters. The portion of the exterior surface of the wire driving roller immediately below the channel has a multiplicity of evenly spaced ridges, the ridges being parallel to the axis of rotation of the wire driving roller.

Also rotatably mounted within the housing is a thumb wheel. The means of rotatable mounting of the thumb wheel is an axle passing through the upper wall of the housing, through the axis of rotation of the thumb wheel, and secured by screw threading to the floor of the housing. The thumb wheel is positioned so that its exterior radial surface comes into frictional contact with the ridges of the wire driving roller. The thumb wheel has a multiplicity of even spaced ridges parallel to the axis of rotation of the thumb wheel for increasing the frictional force which may be applied by the thumb wheel to the wire driving wheel.

As a welder holds the wire holding device by the handle, the welder's thumb may manipulate and rotate the thumb wheel toward the wire dispensing end of the device. In turn, the thumb wheel counter-rotates the wire driving wheel. When a welding wire is positioned within and through the housing, and between the compression roller and the channel of the wire driving roller, the counter-rotating motion of the wire driving roller imparts a frictional force upon the welding wire, driving the welding wire through the housing and out of the wire dispensing aperture.

The interior surface of the wire dispensing aperture preferably is threaded for receiving a threaded hollow cylindrical nipple whose interior diameter is greater than the diameters of common gauges of welding wire. As a welding wire is driven through the wire dispensing aperture, it is driven through the bore of the nipple. A wire retaining cap is closely fitted to and slidably installed over the nipple. The closed end of the cap has a wire retaining aperture therethrough which is closely fitted to the diameter of the welding wire being used, and which is axially aligned with the bore of the nipple. The interior surface of the wire retaining cap has an annular ridge, and the exterior surface of the nipple has an annular channel, the ridge being closely fitted to lie within the channel. As the wire retaining cap is slidably moved over the nipple, the ridge snaps into place within the channel, causing the wire retaining cap to be fixedly attached to the nipple.

As a welding rod progressively passes into and through the housing, the end of the welding rod eventually passes beyond the line of compression imposed by the wire compression roller and the wire driving roller. When this occurs, friction imparted by the wire retaining aperture of the wire retaining cap upon the welding wire prevents the welding wire from falling out. As welding wires of different diameters are used with the device, wire retaining caps having wire retaining apertures of varying diameters may be interchanged.

Points of contact between a welding wire extending through the welding wire holding device and the welding wire holding device are at the interior surface of the wire retaining aperture, at the point of compression between the wire compression roller and the wire driving roller, and potentially on the interior surface of the wire receiving aperture. Contact between the welding wire and any of these points potentially allows an electrical current passing through the welding wire to pass through the welding wire holding device and to a welder's hand. In order to protect against passage of such an electrical current, the wire retaining cap and the wire driving roller are preferably composed of a material having a high dielectric strength such as plastic. Also, preferably, the wire compression roller has an annular sleeve fixedly attached to its exterior radial surface so that a welding wire passing through the welding wire holding device contacts the sleeve; such sleeve being composed of a material having a high dielectric strength such as plastic. Also, preferably, a hollow cylindrical sleeve closely fitted to the wire receiving aperture is fixedly attached to the interior surface of the wire receiving aperture, said sleeve being composed of a material having a high dielectric strength such as plastic. With all potential contact points between a welding wire and the welding wire holding device being insulators rather than conductors, additional protection from passage of current into a welder's hand is provided.

The interior height of the housing at points overlying the compression roller and the wire driving roller are closely fitted to the height of said rollers in order to prevent vertical traveling of said rollers upon their axles. Similarly, the vertical height of the housing at points over the thumb wheel is closely fitted to the height of the thumb wheel in order to prevent vertical travel of the thumb wheel upon its axle.

Preferably, the handle of the wire holding device is at an angle with respect to the housing swept forward toward the wire dispensing end. Such angle allows a hand holding the wire holding device to be kept in a natural position, allowing the device to tilt the welding rod toward a welding workpiece. Also, preferably, the handle of the welding wire holding device has finger indentations to facilitate gripping by a gloved hand.

A feature of the present invention is to provide a novel apparatus for holding, directing, and extending a welding wire used in gas tungsten arc welding, oxyacetylene welding, and similar welding processes.

A further feature of the present invention is to provide a novel apparatus for holding, directing, and extending a welding wire while providing electrical insulation between the welding wire and the welder's hand.

A further feature of the present invention is to provide a novel apparatus for holding, extending, and directing a welding wire, the apparatus having sufficient weight to assist manipulation of the apparatus by a welder's heavily gloved hand.

The above summary of the invention is not intended as a limitation or restriction upon the scope of the invention. Other embodiments of the invention will become apparent to those skilled in the art.

BRIEF DESCRIPTION OF THE DRAWINGS

In the drawings.

A better understanding of this invention as well as further features and advantages thereof will be had by now referring to the accompanying drawings in which.

DETAILED DESCRIPTION OF THE PREFERRED EMBODIMENT

Figure 1:
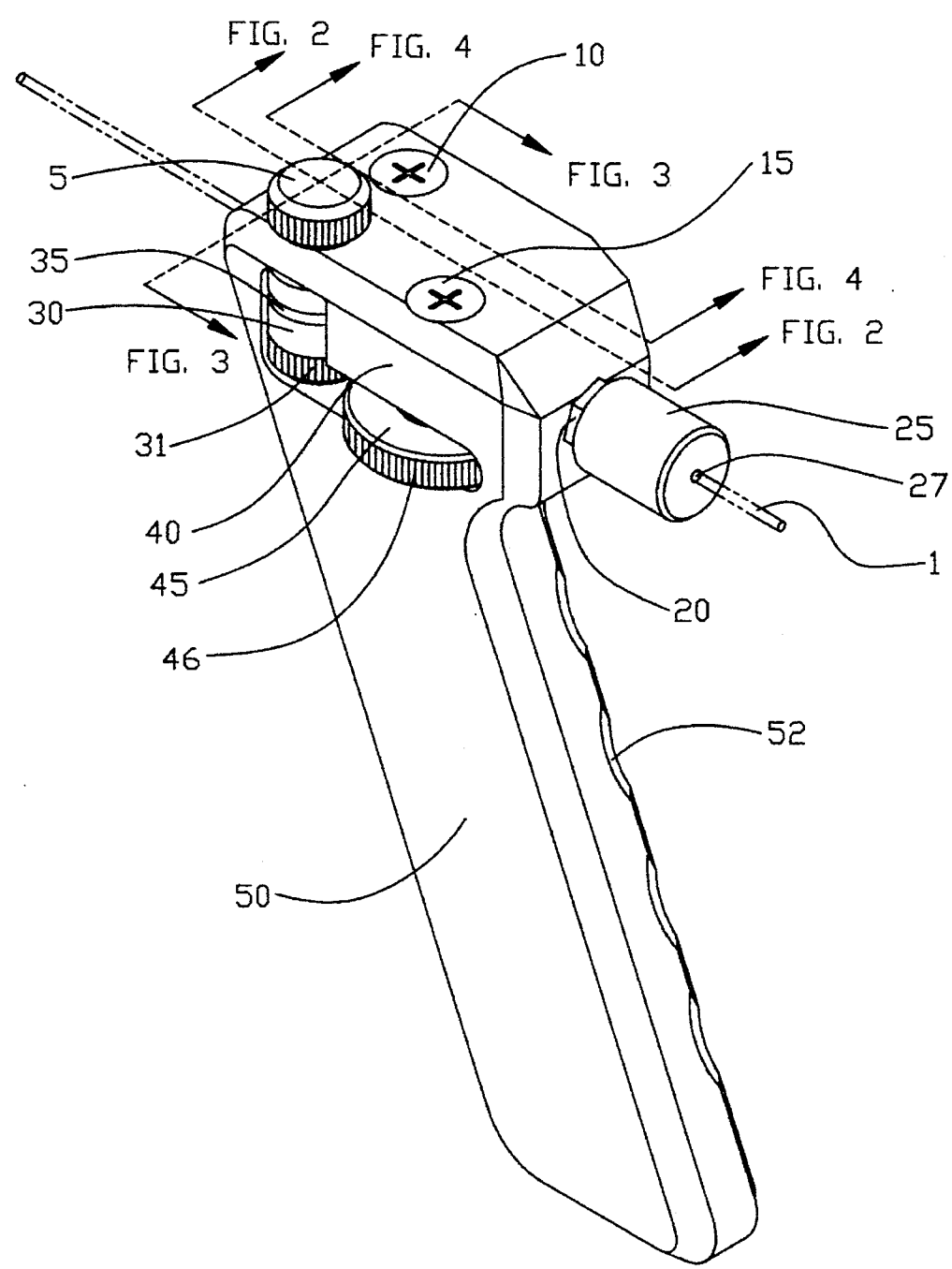
FIG. 1 is a perspective view of the wire holding device.

Referring to FIG. 1, the handle 50 is made to be grasped in a welder's left hand with the wire retaining cap 25 end of the device pointing away from the welder. Finger indentations 52 along the length of the handle facilitate gripping of the device.

Figure 2:
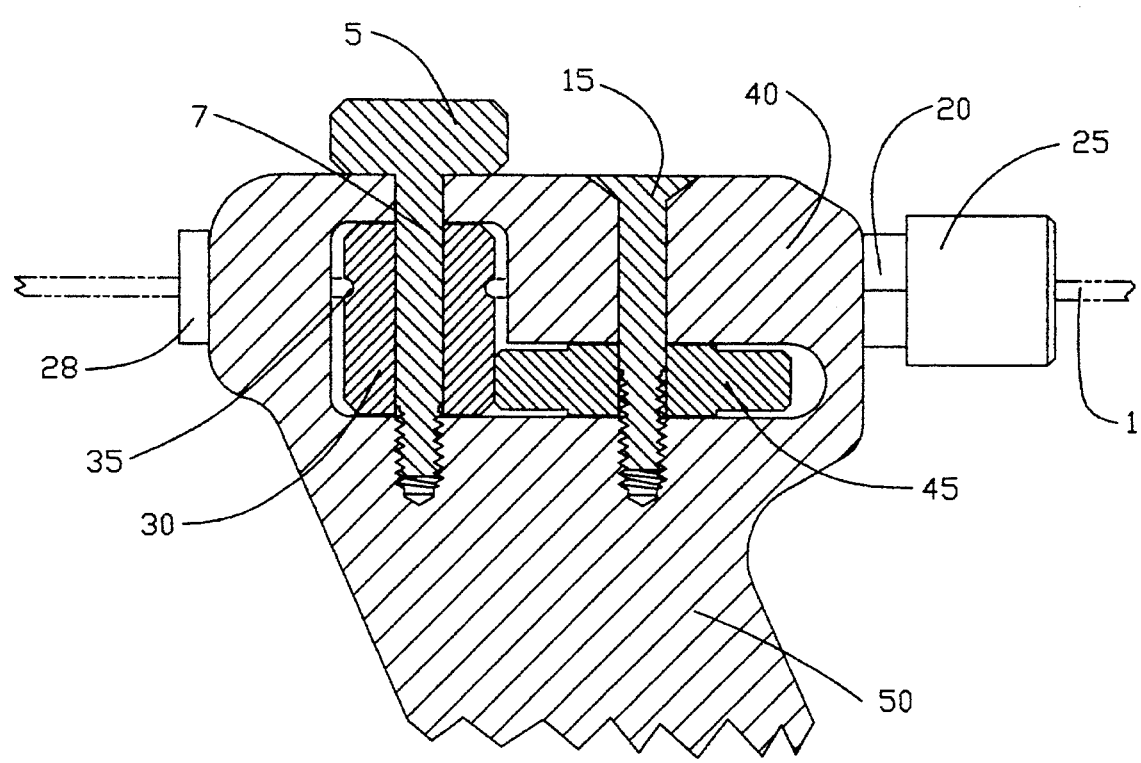
FIG. 2 is a side cutaway view of the welding holding device showing cross sections of the wire driving roller, the thumb wheel, and the wire driving roller and thumb wheel axles.

A thumb wheel 45 is rotatably mounted within the wire dispensing housing 40 by a thumb wheel axle 15; the thumb wheel protruding from the side of the device allowing manipulation of the thumb wheel 45 by the thumb of the welder's hand. Closely spaced thumb wheel ridges 46 on the exterior radial surface of the thumb wheel 45 facilitate manipulation of the thumb wheel by increasing friction between the welder's thumb and the thumb wheel 45. Referring to FIG. 2, the thumb wheel 45 is rotatably mounted within the wire dispensing housing 40 by means of a thumb wheel axle 15.

A wire driving roller 30 is rotatably mounted within the wire dispensing housing 40 by means of, referring to FIG. 2, a wire driving roller axle 7. Referring back to FIG. 1, the wire driving roller 30 is positioned within the wire dispensing housing 40 so that its external radial surface is in contact with the thumb wheel ridges 46 of the thumb wheel 45. At the point of contact, the wire driving roller 30 similarly has wire driving roller ridges 31 which interlock with the thumb wheel ridges 46 of the thumb wheel 45, increasing friction between the wire driving roller 30 and the thumb wheel 45. Upon manipulation of the thumb wheel 45 to rotate in a counter-clockwise motion, the thumb wheel 45 causes the wire driving roller 30 to counter-rotate in a clockwise motion.

The wire driving roller 30 has an annular wire driving channel 35 on its exterior radial surface, the wire driving channel 35 being closely fitted to the diameter of the welding wire 1. The wire driving roller 30 is further positioned within the wire dispensing housing 40 so that the interior surface of the wire driving channel 35 is in contact with the welding wire 1.

Figure 3:
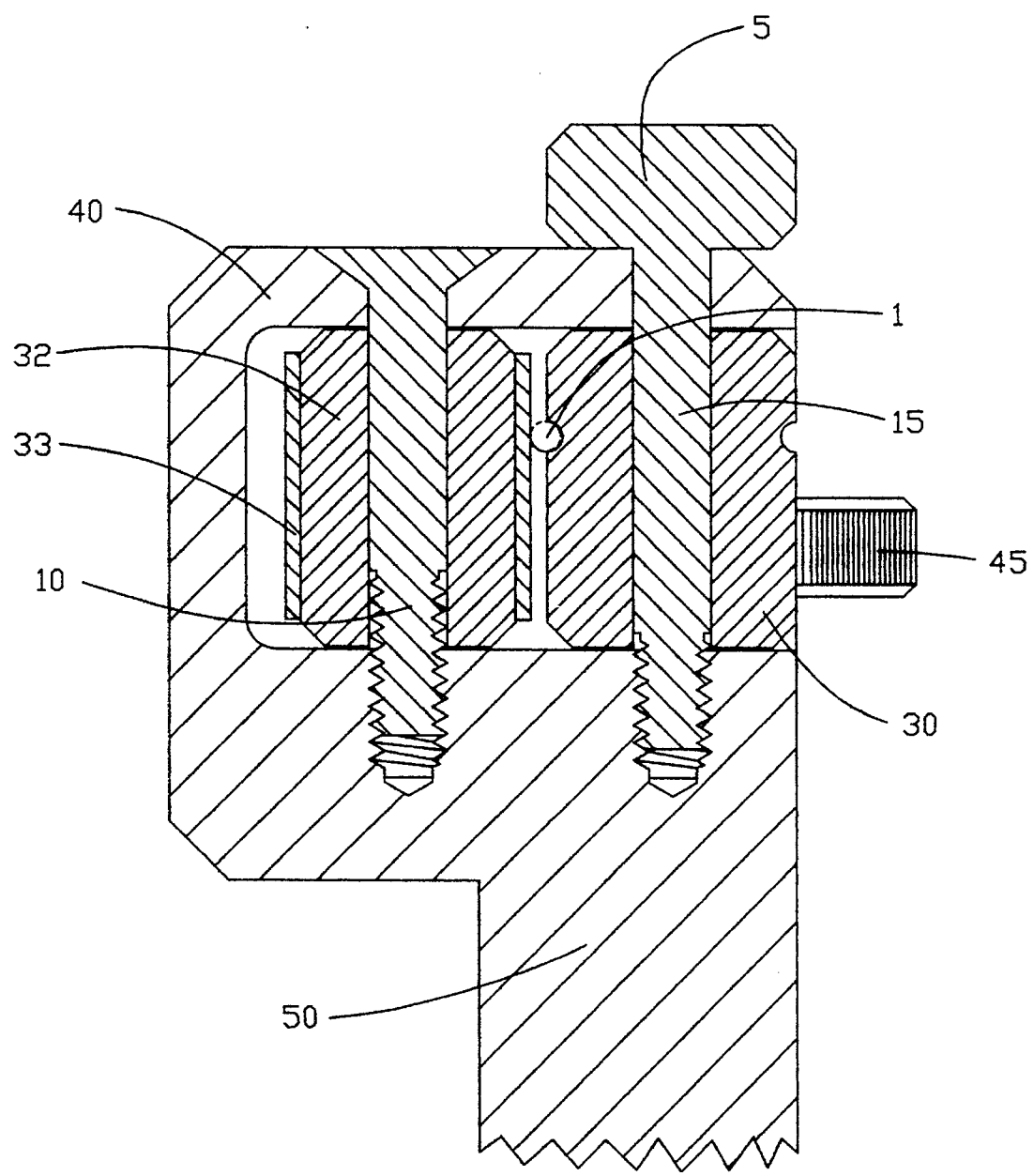
FIG. 3 is a rearward to forward cutaway view of the wire holding device showing cross-sections of the compression roller, the wire driving roller, and the compression and wire driving roller axles.

Referring to FIG. 3, a wire compression roller 32 is rotatably mounted within the wire dispensing housing 40 by means of a wire compression roller axle 10. The wire compression roller 32 is positioned so that it lies on the side of the welding wire 1 opposite the wire driving roller 30 and so that the exterior radial surface of the wire compression roller 32 is in contact with the welding wire 1. The wire driving roller 30 and the wire compression roller 32 being positioned on either side of the welding wire 1 and each being in contact with the welding wire 1 impose a laterally opposed compressive force upon the welding wire 1, increasing the friction between the welding wire 1 and the wire driving channel 35.

Referring to FIG. 1, clockwise rotation of the wire driving roller 30 imposed by counter-clockwise rotation of the thumb wheel 45 causes the interior surface of the wire driving channel 35 to impose a frictional force upon the welding wire 1, thrusting the welding wire 1 forward through the housing.

Figure 4:
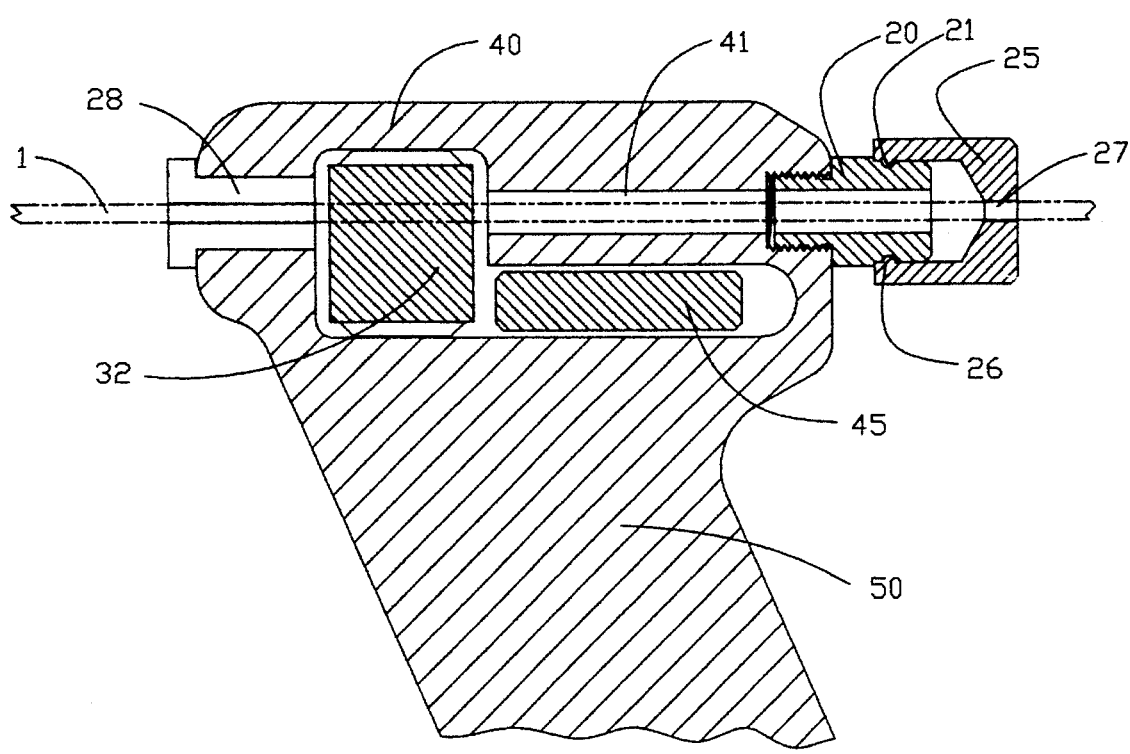
FIG. 4 is a side cutaway view of the welding wire holding device showing cross sections of the nipple, the wire retaining cap, and the sleeve.

Referring to FIG. 4, the wire dispensing housing 40 has a wire dispensing aperture 41 through which the welding wire 1 outwardly passes. Fixedly attached to the wire dispensing housing 40 by means of screw threading is a nipple 20, the nipple 20 being aligned with and forming an extension of the wire dispensing aperture 41. Slidably mounted over the nipple 20 is a wire retaining cap 25. The nipple 20 has an annular exterior cap retaining channel 21, and the wire retaining cap 25 has an annular interior cap retaining ridge 26, the cap retaining ridge 26 being fitted to snap into place within the cap retaining channel 21 to hold the wire retaining cap 25 fixedly in place over the nipple 20. The closed end of the wire retaining cap 25 has a wire retaining aperture 27 which is closely fitted to the welding wire 1. Referring to FIG. 1, progressive thrusting of the welding wire 1 through the wire dispensing housing 40 will eventually cause the end of the welding wire 1 to pass beyond the wire driving roller 30. When this occurs, friction between the welding wire 1 and the interior surface of the wire retaining aperture 27 prevents the welding wire 1 from sliding out of the device.

Referring simultaneously to FIGS. 1 and 2, the wire driving roller axle 7 has a knurled head 5 allowing the wire driving roller axle 7 to be manually unscrewed and removed. Through removal of the wire driving roller axle 7, the wire driving roller 30 may be removed and interchanged with another wire driving roller having a channel fitted to drive a welding wire of a different diameter. Similarly, the wire retaining cap 25 may be manually removed from the nipple 20 by pulling upon the wire retaining cap 25. Upon such removal, a different wire retaining cap having a wire retaining aperture fitted to a welding wire of a different diameter may be snapped into place over the nipple 20.

Preferably, all points of contact between the welding wire and the wire holding device are insulated to prevent conduction of electric current. Referring to FIG. 4, the wire retaining cap 25 and sleeve 28 are composed of a material having a high dielectric strength such as plastic. Referring to FIG. 2, the wire compression roller 32 has an annular sleeve 33 composed of a material with a high dielectric strength such as plastic. The wire driving roller 30 similarly is made of high dielectric strength material such as plastic.

The handle 50 is swept forward at an angle with respect to the welding wire 1 allowing a welder's hand holding the device to remain in a nature position while the device tilts the welding wire 1 a welding workpiece.

The above detailed description is not intended as a limitation or restriction on the scope of the invention. Other embodiments of the invention will become apparent to those skilled in the art.

What I claim is:

1. A welding wire holder comprising:

A) A wire dispensing housing having a floor, a front wall, and having a back wall, the front wall having a wire dispensing aperture therethrough, the back wall having a wire receiving aperture therethrough, the upper surface of the floor being substantially flat, and the lower surface of the floor extending downward from the upper surface to form a handle, the handle being of a size and shape suited to be gripped by a welder's gloved hand;

B) A wire compression roller rotatably mounted within the housing, the axis of rotation of the wire compression roller being substantially perpendicular to the floor of the housing, and the wire compression roller being positioned within the housing so that its exterior radial surface is tangent to a line extending from the wire receiving aperture to the wire dispensing aperture so that a welding wire extended through said apertures may come into contact with the wire compression roller;

C) A wire driving roller rotatably mounted within the housing, the axis of rotation of the wire driving roller being substantially perpendicular to the floor of the housing, and the wire driving roller being positioned within the housing so that its radial exterior surface is tangent to a line extending from the wire receiving aperture to the wire dispensing aperture, so that a welding wire extending through said apertures may simultaneously come into contact with the wire compression roller and the wire driving roller, and so that the welding wire may receive a laterally opposed compressive force from said rollers; and, D) A thumb wheel rotatably mounted within the housing, the axis of rotation of the thumb wheel being substantially perpendicular to the floor of the housing, the thumb wheel being positioned so that its exterior radial surface is in frictional contact with the exterior radial surface of the wire driving roller, and the thumb wheel being positioned so that its exterior radial surface extends outwardly from the housing, allowing the thumb of a gloved hand holding the handle to rotate the thumb wheel, resulting in counter-rotation of the wire driving roller, resulting in frictional thrust imposed by the wire driving roller upon a welding wire, the welding wire extending through the wire receiving aperture, between the wire compression and the wire driving rollers, and extending through the wire dispensing aperture, dispensing the welding wire from the wire dispensing aperture.

2. The apparatus of claim 1 further comprising a hollow cylindrical nipple fixedly attached to the exterior surface of the front wall of the housing, the nipple being positioned so that its bore is axially aligned with the wire dispensing aperture, allowing a welding wire extending through the wire dispensing aperture to further extend through the bore of the nipple; and further comprising a wire retaining cap closely fitted to and slidably mounted over the nipple, the closed end of the wire retaining cap having a wire retaining aperture therethrough, the wire retaining aperture being axially aligned with the bore of the nipple so that a welding wire extending through the nipple may further extend through the wire retaining aperture, the wire retaining aperture being closely fitted to the welding wire allowing the interior surface of the aperture to impose a frictional force upon the welding wire.

3. The apparatus of claim 2 further comprising an upper wall fixedly attached to the upper surfaces of the front wall and the back wall, the upper wall having a first, a second and a third axle receiving aperture, such apertures being axially aligned with the axes of rotation of the wire compression roller, the wire driving roller and the thumb wheel, respectively; and wherein the wire compression roller, the wire driving roller and the thumb wheel are rotatably mounted within the housing by means of axles, each axle being aligned with and extending through the respective axes of rotation of the wire compression roller, the wire driving roller and the thumb wheel, the lower end of each such axle being fixedly attached to the floor of the housing, and the upper end of each such axle extending into and being retained by the first, second, and third axle receiving aperture respectively.

4. The apparatus of claim 3 wherein the wire driving roller has an annular semi-circular wire driving channel, the wire driving roller and the wire driving channel being positioned so that the surface of a welding wire passing between the compression roller and the wire driving roller comes into frictional contact with the interior surface of the wire driving channel, the depth and width of the wire driving channel being closely fitted to the radius of curvature of the welding wire; wherein the nipple has an annular cap retaining channel on its exterior radial surface, and wherein the wire retaining cap has an annular ridge on its interior radial surface, the cap retaining ridge being closely fitted to the cap retaining channel of the nipple so that the wire retaining cap upon slidable movement over the nipple fixedly snaps into place upon engagement of the cap retaining ridge with the cap retaining channel.

5. The apparatus of claim 4 wherein the means of fixed attachment of the wire driving roller axle, the wire driving roller axle and the thumb wheel axle to the floor of the housing is screw threading of the ends of said axles interlocking with threaded apertures in the floor of the housing.

6. The apparatus of claim 5 wherein the second axle receiving aperture extends completely through the upper wall, wherein the upper end of wire driving roller axle extends through the second axle receiving aperture to protrude from the upper surface of the upper wall; and further comprising a knurled head fixedly attached to the upper end of the wire driving roller axle allowing said axle to be manually installed and removed, and allowing the wire driving roller to be manually installed and removed.

7. The apparatus of claim 6 wherein the exterior radial surface of the wire driving roller which comes into contact with the exterior radial surface thumb wheel has a multiplicity of closely spaced ridges each being parallel to the axis of rotation of the wire driving roller, and wherein the exterior radial surface of the thumb wheel has a multiplicity of closely spaced ridges, each being parallel to the axis of rotation of the thumb wheel, the ridges of the wire driving roller and the ridges of the thumb wheel being closely fitted to interlock with each other.

8. The apparatus of claim 7 wherein the wire dispensing aperture is circular with a threaded interior surface, and wherein the means of fixed attachment of the nipple to the front wall of the housing is screw threading on the exterior radial surface of the nipple interlocking with the screw threading on the interior radial surface of the wire dispensing aperture.

9. The apparatus of claim 8 wherein the handle is swept forward toward the wire dispensing end of the housing allowing a welding wire extending within and through the wire dispensing housing to be directed at an angle toward a welding piece while a welder's hand holding the handle is held in a natural position; and wherein the exterior surface of the handle has a plurality of finger indentations facilitating the grip of the welder's hand upon the handle.

10. The apparatus of claim 9 wherein the wire retaining cap and the wire driving roller are composed of a plastic material; further comprising a hollow cylindrical plastic sleeve fixedly attached to the interior surface of the wire receiving aperture; and further comprising a thin annular plastic sleeve fixedly attached to the exterior surface of the wire compression roller.

\* \* \* \* \*